United States Patent [19]  
Breford

[11] 3,941,407  
[45] Mar. 2, 1976

[54] FIFTH WHEEL TRAILER HITCH
[75] Inventor: Glenn H. Breford, Holyrood, Kans.
[73] Assignee: Midway Industries, Inc., Holyrood, Kans.
[22] Filed: Nov. 18, 1974
[21] Appl. No.: 524,381

Related U.S. Application Data
[63] Continuation-in-part of Ser. No. 379,713, July 16, 1973, Pat. No. 3,848,894.

[52] U.S. Cl............ 280/415 A; 280/423 R; 280/505
[51] Int. Cl.²........................................ B62D 53/08
[58] Field of Search.... 280/415 A, 434, 433, 423 R, 280/437, 505, 408

[56] References Cited  
UNITED STATES PATENTS

| 1,880,123 | 9/1932 | Davis et al............... | 280/408 |
| 2,838,326 | 6/1958 | Georgi................ | 280/434 |
| 2,925,286 | 2/1960 | Hodges et al............. | 280/423 RX |
| 3,056,612 | 10/1962 | Slaven................. | 280/434 |
| 3,194,585 | 7/1965 | Cochrane................ | 280/437 |
| 3,682,360 | 8/1972 | Fletcher et al............ | 280/505 X |
| 3,820,821 | 6/1974 | Leland................ | 280/433 X |
| 3,848,894 | 11/1974 | Breford................ | 280/437 |

Primary Examiner—Philip Goodman  
Assistant Examiner—John A. Pekar  
Attorney, Agent, or Firm—John H. Widdowson

[57] ABSTRACT

A fifth wheel trailer hitch has a mounting plate rigidly mountable on a supporting surface. A pair of spaced upright ends are removably mountable on the mounting plate. The hitch has a cross member pivotally mounted with the upright ends. A coupler is mounted on the upper side of the cross member to engage a coupler on a trailer.

6 Claims, 8 Drawing Figures

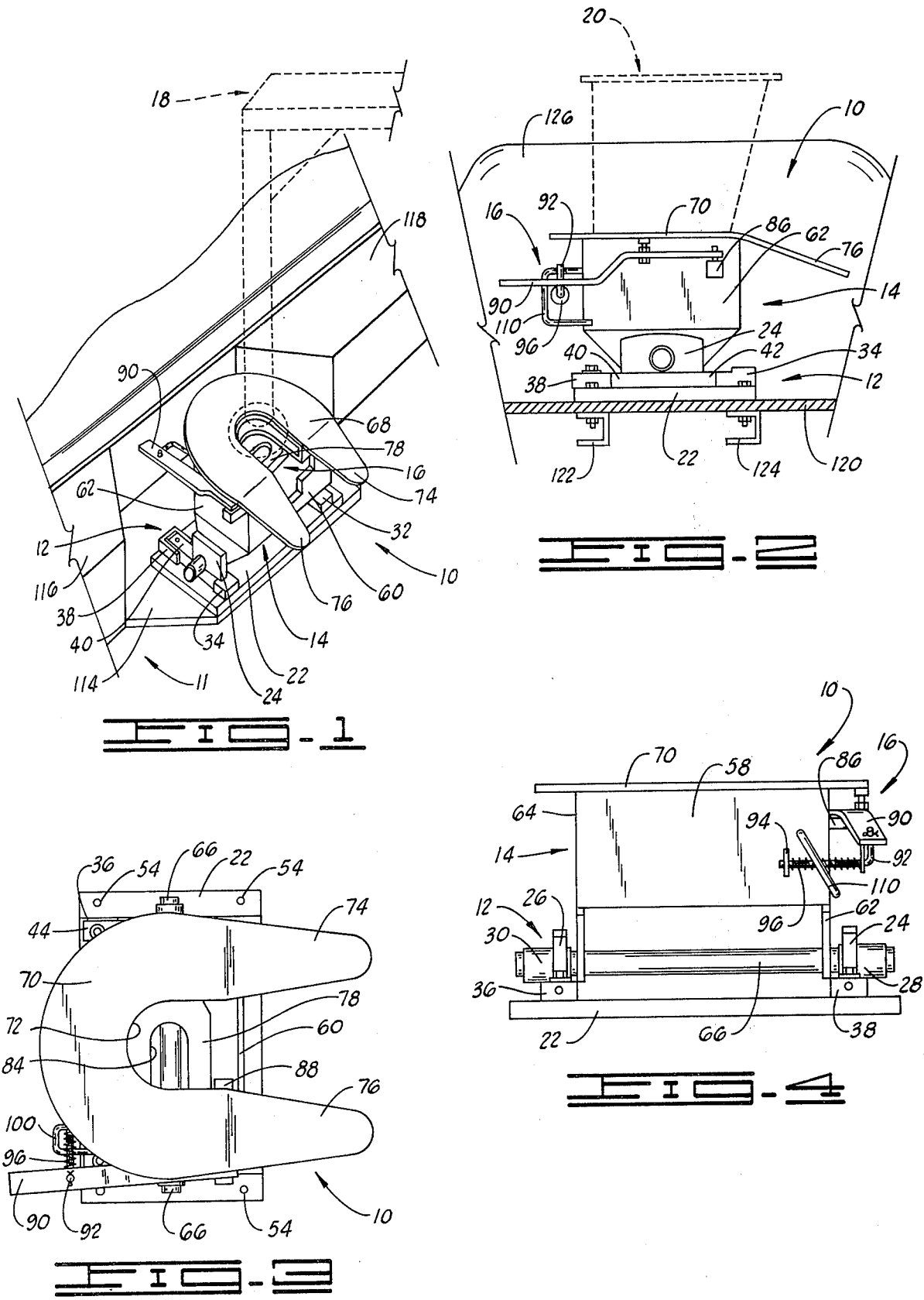

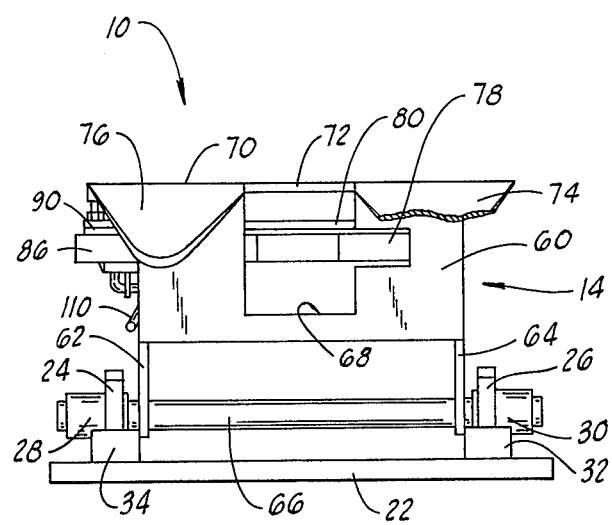
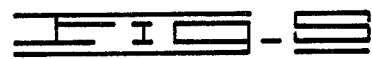
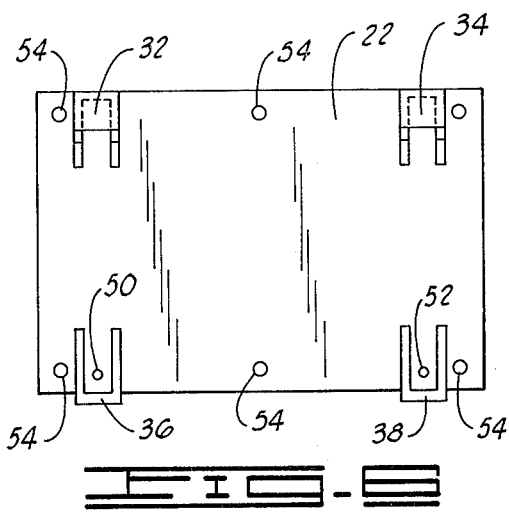
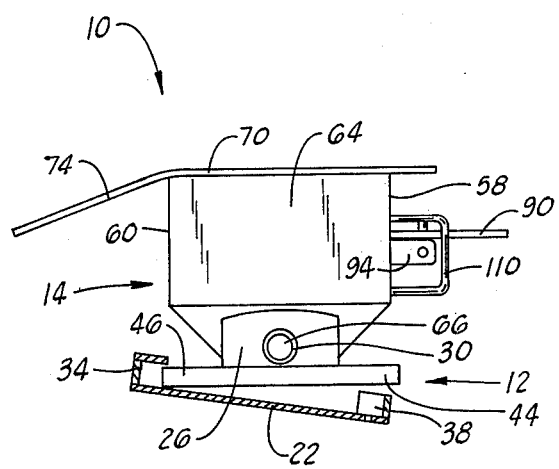
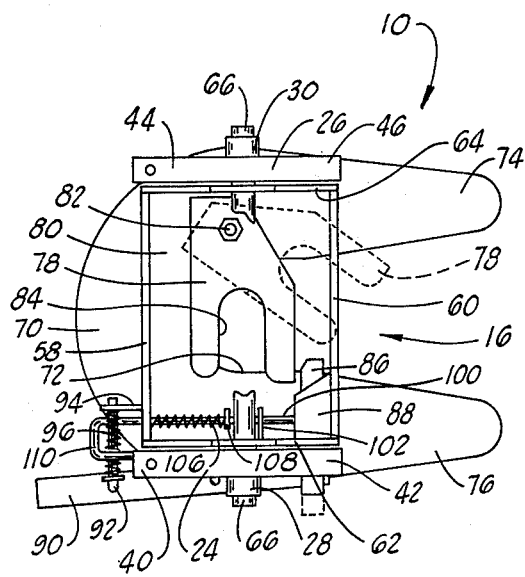

3,941,407

FIFTH WHEEL TRAILER HITCH

CROSS REFERENCE TO RELATED APPLICATION

This application is a continuation-in-part application based on my presently pending application entitled FIFTH WHEEL TRAILER HITCH, having Ser. No. 379,713 filed July 16, 1973, issued as U.S. Pat. No. 3,848,894 on Nov. 19, 1974.

BACKGROUND OF THE INVENTION

This invention is related to fifth wheel type trailer hitches which are removably mountable on a towing vehicle. More particularly, the invention is a fifth wheel type trailer hitch which is mountable on the bed of a truck or on the bumper of a truck and which can be easily removed from the vehicle.

Numerous types of fifth wheel trailer hitches are known in the prior art for pulling trailers. However, these known prior art hitches are generally permanently mounted with the vehicles, however, some are removably mounted. Of those hitches which are movably mountable with a vehicle they generally require a large or broad base of support for stability. In order to have a broad base of support these hitches must have a broad or rather large mounting fixture permanently mounted in the bed of a truck. This mounting fixture generally not removable from a truck bed because it must be permanently secured to the truck to rigidly mount the hitch. Because this mount is relatively large it prevents any significant use of the truck for carrying other loads when the removable part of the hitch is removed. As a rule, the permanently installed mounting fixture extends transverse to the truck bed across a center portion of the bed and it extends upward from the bottom of the bed. This type of fixture would obviously prevent the truck from being used to carry lengthy or large size loads to prevent damage to the mounting fixture or the cargo.

SUMMARY OF THE INVENTION

The fifth wheel trailer hitch of this invention generally includes a fifth wheel type coupling apparatus and a mount therefor wherein the mount structure enables the hitching apparatus to be removably mounted with a vehicle. More specifically, the hitch of this invention can be mounted in the bed of a truck on the floor thereof or it can be mounted on a vehicle bumper. The fifth wheel hitch mount has a mounting plate which is rigidly mountable on a supporting structure, and a pair of spaced upright end portions which are removably mountable with the mounting plate. The hitch structure has a cross member with a shaft mounted therethrough with the shaft being pivotally mounted in the upright end portion. A coupler is mounted on the upper side of the cross member and constructed and adapted to receive and mount in towing relation a coupler apparatus such as a king pin or the like on a trailer. The mounting plate has a socket and guide structure to receive and position the upright ends so they can be rigidly secured to the mounting plate. When the trailer hitch is mounted with a truck bed it is secured to the chassis of the truck and positioned on the floor of the truck bed. When the hitch is mounted with a vehicle bumper the mounting plate is rigidly secured to a horizontally disposed portion of the bumper structure.

One object of this invention is to provide a fifth wheel trailer hitch structure overcoming the aforementioned disadvantages of the prior art devices.

Still, one other object of this invention is to provide a fifth wheel trailer hitch structure having a mounting assembly with a mounting plate that is rigidly securable to a supporting surface and a pair of spaced upright end portions which are removably mountable with the mounting plate.

Still, another object of this invention is to provide a fifth wheel trailer hitch structure which has a mounting assembly for removably mounting same with a vehicle wherein the removable portion of the hitch structure has a cross member with a coupling apparatus on the upper side thereof to receive and mount in towing relation a cooperative coupling apparatus such as a king pin on a trailer or the like.

Yet, another object of this invention is to provide a fifth wheel trailer hitch structure for use with a pickup truck or the like wherein the hitch is removably mountable in the bed of the truck with only a small relatively thin mounting plate being permanently mounted with the truck.

Still, another object of this invention is to provide a fifth wheel trailer structure for use with a vehicle wherein the hitch is removably mountable with the bumper of the vehicle and further wherein the hitch has a small relatively thin mounting plate permanently mounted with the bumper.

Various other objects, advantages, and features of the invention will become apparent from those skilled in the art from the following discussion, taken in conjunction with the accompanying drawings.

DESCRIPTION OF THE DRAWINGS

FIG. 1 is a perspective view of a portion of the rear of a vehicle having a safety bumper with the trailer hitch of this invention mounted thereon. A portion of a gooseneck-type trailer connector is shown in dashed lines mounted with the hitch;

FIG. 2 is a side elevation view of the trailer hitch in mounted position in the bed of a truck, with portions of the bed and wheel well of the pickup truck shown for clarity. A pin box type trailer coupler is shown in dashed lines mounted with the hitch;

FIG. 3 is a top plan view of the hitch and the mount alone;

FIG. 4 is a front side elevation view of the hitch and the mount therefor;

FIG. 5 is a rear elevation view of the hitch and the mount with the rear portions of the bearing plate cut away for clarity;

FIG. 6 is a top plan view of the mounting plate alone with the interior of the sockets shown in dashed lines;

FIG. 7 is a side elevation view of the hitch and the mount with the upright ends displaced from their mounted position illustrating how they engage the mounting plate; and FIG. 8 is a bottom plan view of the cross member of the hitch with the center portion of the shaft cut away for clarity exposing the jaw and locking bolt assemblies of the coupler. The jaw is shown in dashed lines in a pivoted position.

The following is a discussion and description of preferred specific embodiments of the fifth wheel trailer hitch structure of this invention, such being made with reference to the drawings, whereupon the same reference numerals are used to indicate the same or similar parts and/or structure. It is to be understood that such discussion and description is not to unduly limit the scope of the invention.

DESCRIPTION OF PREFERRED EMBODIMENTS

Referring to the drawings in detail and in particular to FIG. 1, wherein the trailer hitch structure of this invention is indicated generally at 10 and shown mounted on a vehicle bumper 11. The fifth wheel trailer hitch structure 10 of this invention includes a mount assembly 12 which pivotally mounts a cross member 14 on the upper portion thereof. A coupler assembly, indicated generally at 16, is mounted on the upper portion of the cross member 14. The mount assembly 12 is constructed so that the cross member 14 can be removed from the mount assembly. The pivotally mounted cross member 14 is in use supported to pivot about a line transverse to the elongated axis of the vehicle on which it is mounted. The coupler assembly 16 is constructed and adapted to receive and mount a king pin or the like of a trailer in a towing connection. FIG. 1 illustrates, in dashed lines, a gooseneck-type coupler, indicated generally at 18, connected with the trailer hitch 10. FIG. 2 shows the trailer hitch structure 10 mounted in the bed of a truck and connected with a pin box, indicated generally at 20 and shown in dashed lines.

The mount assembly 12 includes a mounting plate member 22 with socket and guide members secured to its upper portion, and upright end members 24 and 26 removably mountable with the socket and guide members. Each of the upright end members 24 and 26 has a sleeve member rigidly mounted therethrough to receive and pivotally mount a shaft. The sleeve members 28 and 30 are secured to the end members 25 and 26 respectively. The socket and guide portion of the mount assembly 12 includes socket members 32 and 34 rigidly secured to one edge portion of the mounting plate 22 and guide members 36 and 38 rigidly secured to the opposite side of the mounting plate 22 as shown in FIG. 6. The socket members 32 and 34 have generally cross-sectionally U-shaped sides which are rigidly secured to the upper surface of the mounting plate 22 with their open portion opening toward the center portion of the mounting plate. The socket members 32 and 34 are covered on the closed end portion of their sides which is the portion nearest to the peripheral portion of the mounting plate 22. The guide members 36 and 38 are generally U-shaped members which have their sides secured to the upper surface of the mounting plate 22 and which open toward the center portion of the mounting plate. FIG. 7 shows socket 34 and guide member 38 in a vertically taken cross section.

The upright end members 24 and 26 are both constructed essentially the same and each has lug members extending oppositely from the lower portion thereof. For the upright end member 24 the lugs are indicated at 40 and 42. For the upright end member 26 the lugs are indicated at 44 and 46. Lug members 40 and 44 are each provided with an aperture as shown in FIG. 8. The mounting plate 22 is provided with threaded apertures 50 and 52 located in the confines of the U-shaped guide members 36 and 38. When the trailer hitch 10 is secured to the mounting plate 22 then bolts are passed through the apertures in the lugs 40 and 44 and connected with the mounting plate at the threaded apertures 50 and 52 to secure the upright end members 24 and 26 rigidly in place on the mounting plate 22. The mounting plate 22 is also provided with a plurality of apertures indicated at 54 at its corners and at midpoints on its opposed sides as shown in FIG. 6. The apertures 54 are used to receive mounting bolts for securing the mounting plate to a suitable supporting structure such as the bumper 11 as shown in FIG. 1 or the truck bed as shown in FIG. 2.

The cross member portion of the trailer hitch structure 10 is essentially a box-like structure having a front side 58, a rear side 60, and opposed ends 62 and 64 which are rigidly secured together. The opposed ends 62 and 64 extend downward and below the front side 58 and back side 50 as shown. A shaft 66 is rigidly secured to the opposed ends 62 and 64 with the opposed ends of the shaft extending substantially from the cross members ends 62 and 64. The opposed end portions of the shaft 66 are mounted in the sleeves 28 and 30 of the upright members 24 and 26. The shaft 66 extends transversely through the cross member as shown. The cross member back 60 has an aperture 68 as shown in FIG. 5 to receive and pass the coupler pin of a trailer or the like. The interior of the cross member 14 encloses the jaw and locking bolt portion of the coupler mechanism 16. The top of the cross member is defined by the bearing plate 70. The bearing plate 70 is a generally U-shaped plate like member on which a flanged portion of a trailer coupler rests when it is connected with the trailer hitch 10. The bearing plate 70 has a U-shaped notch or slot 72 which extends into its center portion as shown. The slot 72 opens rearward. The rearwardly disposed end portions 74 and 76 of the bearing plate 70 are turned downwardly as shown. The coupler mechanism 16 includes a jaw member 78 pivotally mounted on a brace member 80 located inside the cross member. The brace member 80 extends between all four sides of the cross member 12 inside the cross member and it is spaced slightly below the bearing plate 70. The brace 80 is notched to correspond with the bearing plate notch 72. The jaw 78 is pivotally mounted by a bolt 82. The jaw 78 is elongated with one end mounted at the bolt 82 and the opposite end thereof having an elongated slot 84. The jaw 78 spans the notch 72 in the bearing plate 70 and brace 80 as shown in FIG. 8 when it is in the locked positioned. A locking bolt 86 is slidably mounted in the cross member and supported in a sleeve like guide 88. A lever 90 is pivotally secured to the underneath side of the bearing plate 70 and pivotally secured on one end to one end portion of the locking bolt 86. The handle end of the lever 90 extends forwardly preferably beyond the forward end of the bearing plate 70. A spring assembly is provided to urge the handle end portion of the lever 90 outward thus urging the locking bolt 86 toward the locked position. FIG. 8 shows the locking bolt 86 in the locked position. The spring assembly includes a spring guide member 92 pivotally mounted with the handle end portion of the lever 90 and slidably mounted in a lug 94 on the cross member's forward side 58. A spring 96 is mounted in compression over the guide member 92 between the lug 94 and the end portion of the guide member 92 which is attached to the lever 90. The force of the spring 96 against the lug 94 urges the handle end portion of the lever 90 outward and the locking bolt 86 toward the locked position.

The coupling mechanism 16 also has a second locking bolt assembly in addition to the first described locking bolt assembly. The second locking bolt assembly is provided as a lock or a securing device for the first described locking bolt assembly. The second locking bolt assembly has a locking bolt 100, preferably in the form of an elongated rod, which is mounted with the cross member 14 and resiliently urged toward the first locking bolt 86. The locking bolt 100 extends through an aperture in the side 58 and it is supported by a lug 102 inside the cross member. Lug 102 is rigidly secured to side member 62. The locking bolt guide 88 is provided with an aperture (not shown) to receive the end portion of the locking bolt 100. Accordingly locking bolt 86 is provided with an aperture (not shown) in a midportion thereof to receive and hold in a locking relation the end portion of locking bolt 100. The aperture in locking bolt 86 aligns with the aperture in guide member 88 when locking bolt 86 is in the locked position so the end of locking bolt 100 can pass through the guide 88 into the aperture in locking bolt 86 to secure locking bolt 86 in the locked position. FIG. 8 shows the second locking bolt 100 in the locked position with the other locking bolt 86. A spring 106 is compressed between the front cross member 58 and a stop member 108 rigidly secured on the locking bolt 100. The force of the spring between the stop member 108 and the front member 108 urges the locking bolt 100 to the locked position or toward the locking bolt 86. The second locking bolt 100 is provided with a handle like portion 110 on its outer end portion which is external to the front member 58. The handle portion 110 is generally U-shaped as shown. When the second locking bolt 100 is in the locked position the extreme end of the handle portion thereof 100 is preferably positioned as shown in FIGS. 2 and 4 with the tip of the unattached end portion thereof being adjacent to the cross member end 62.

The novel locking bolt structure of the fifth wheel trailer hitch of this invention is an important feature of the invention. The two locking bolts 86 and 100 function cooperatively to retain the jaw 78 in a secured or locked position. When the jaw 78 is in the locked position as it would be when towing a trailer the locking bolts 86 and 100 are positioned as shown. When the jaw 78 is opened or released from the locked position it can be positioned as shown in the dashed lines of FIG. 8. In order to release the jaw the second locking bolt 100 is pulled with its handle portion 110 being moved away from the member front 58 and the handle end portion of the lever 90 being pushed toward the center portion of the trailer hitch. It is to be noted that the second locking bolt 100 can be rotated so the tip of its handle end portion 100 rests on the cross member's front side 58 to position it so that it will not interfere with the motion of the first locking bolt 86. It is to be noted that spring 96 urges locking bolt 86 to the extended position as shown in the solid lines in FIG. 8. In use the jaw 78 is positioned as shown in the dashed lines of FIG. 8 prior to receiving the coupling pin of a trailer or the like. Once the trailer hitch is positioned at the trailer's coupling pin the vehicle supporting the trailer hitch is backed into position so the coupling pin is passed into the slot 72 in the bearing plate 70 through and the aperture 68 in the cross member side 60 and engaged with the slot 84 in the jaw 78. As the trailer hitch continues to move rearward the jaw slot 84 contacts the coupling pin and the jaw 78 rotates to the position shown in the solid lines of FIG. 8. When the jaw 78 is in this position the locking bolt 86 slides over the ends of the jaw 78 to finally rest in the locked position as shown in the solid lines in FIG. 8. Once the locking bolt 86 is in position the second locking bolt 100 can be moved to the locked position to secure the locking bolt 86.

In order to secure the trailer hitch 10 to a vehicle for use the mounting plate 22 is first secured to the vehicle by any suitable manner and preferably as described hereinafter on a vehicle bumper 11 or on a truck bed. The mounting plate 22 is preferably positioned with the socket members 32 and 34 being on the rearwardly disposed portion of the mounting plate. However, it is to be understood that the sockets can be on the forwardly disposed portion of the mounting plate 22 if desired. The upright end members 24 and 26 are secured to the socket members and guide members on the mounting plate by inserting the lugs 42 and 46 into the socket members 32 and 34 respectively, and at the same time lowering the other lugs 40 and 44 into the guide members 36 and 38 respectively. FIG. 7 illustrates the relative position of the lugs, socket member 34 and guide member 38 with the upright end 26 being in a slightly displaced position. To mount the upright end members they are moved downwardly and toward the sockets as the lugs are inserted into the socket members and guide members. An upward motion is used to dismount the upright ends 24 and 26 from the mounting plate structure 12. Once the upright ends 24 and 26 are in place with the mount 12 they are secured by bolts through the apertures in the forwardly disposed lugs 42 and 44.

FIG. 1 shows the trailer hitch 10 of this invention mounted on a vehicle bumper 11. The vehicle bumper is preferably of the type generally referred to as a safety bumper and commonly used on small trucks such as pickups and on some recreational and utility vehicles. The bumper 11 is normally rigidly secured to the chassis of the vehicle on which it is mounted so that it provides a rigid mounting structure for a trailer hitch. The bumper 11 as illustrated, has a recessed portion with an open top and an open back located in the center portion thereof. A plate member 114 forms the bottom of the recessed portion. The plate member 114 is preferably rigidly secured, by welding, to the bumper structure and it extends rearwardly beyond the rear edge portion of the bumper's opposed end portions 116 and 118. The plate member 114 is significantly larger than the bottom member of a conventional safety bumper because it must accommodate the mounting plate 22. Preferably the mounting plate 22 is rigidly secured to the bumper plate member 114 by bolts or the like passing through the apertures 54 in the mounting plate. The bumper plate member 114 is large enough to accommodate the trailer hitch 10 in the mounted position so the lever 90 and forward portion of the bearing plate 70 do not contact any portion of the bumper or the vehicle. The fact that the cross member 14 is removably mountable with the mount structure 12 is an important feature of the invention when it is used on a vehicle bumper because it allows this portion of the hitch to be removed when it is not needed. Because the cross member 14 is removable it provides an obvious safety feature as well as providing for removal of the operating portions of the hitch structure to prevent theft.

FIG. 2 shows the trailer hitch 10 mounted in the bed of a pickup truck or the like. In this installation the mounting plate 22 rests on the floor 120 of the truck bed and it is bolted to chassis cross members 122 and 124 extending under the bed floor. The cross members 122 and 124 may be added to an existing truck structure by welding them to the sides of the chassis as required or they can be provided in new constructions. Preferably the mounting plate 22 is bolted to the floor 120 and to the members 122 and 124 so it can be removed if necessary. It is to be noted that the trailer hitch 10 is quite close to the floor 120 of the truck bed and substantially spaced below the top of the sides of the bed when it is installed in a pickup truck. A wheel well of a pickup truck is indicated at 126 to illustrate the relative size of the preferred construction of the trailer hitch 10. When the mount assembly 12 is secured to the bed portion of a truck as shown the mounting plate 22, the sockets 32 and 34 and the guides 36 and 38 are relatively close to the upper surface of the floor 120, thus, they provide only a very minimal obstacle when the cross member 14 is dismounted and removed. Normal conventional pickups as currently manufactured have the top of the wheel wells approximately 14 inches (35.6 cm) above the bed's floor 120 and the top of the sides is approximately 22 inches (55.9 cm) above the floor 120. In practice the trailer hitch of this invention has been constructed with the top of the bearing plate 70 being approximately 9 inches (22.8 cm) above the floor 120.

It is to be noted that the trailer hitch 10 of this invention can be mounted on the chassis of a vehicle as well as the bumper and bed installations described above. For instance, it can be mounted directly on the chassis of a tractor type vehicle that is used primarily for pulling trailers. Or it can be mounted on a dolly like vehicle that is used in pulling multiple trailer vehicles.

In the manufacture of the fifth wheel trailer hitch 10 of this invention it is obvious that same can be easily constructed to achieve the end product. The structural features of the fifth wheel trailer hitch are basically simple and would present no manufacturing problems. The construction of the mount assembly 12 can be easily accomplished by mass production techniques so that the upright ends are interchangable while still maintaining relatively close tolerances. The basic construction of the coupler assembly 16 is relatively simple and can also be constructed by mass production techniques.

In the use and operation of the fifth wheel trailer hitch of this invention it is seen that same provides a fifth wheel type trailer hitch which is usable with the popular style of the small and intermediate size utility and travel trailers which utilize the fifth wheel type hitch. The trailer hitch structure 10 has a relatively small mounting plate which can be permanently secured to the floor of a truck bed or to the bumper of a vehicle. Because the permanently mounted mounting plate is relatively small and thin it will not substantially interfere with the use of the truck bed for carrying cargo nor will it provide any significant unsightly fixture on the vehicle bumper. The structure of the upright ends and cross member is such that the major portion of the hitch can be easily removed from the mounting plate.

As will become apparent from the foregoing description of the Applicant's fifth wheel trailer hitch, relatively simple means have been provided to add a removable feature to a fifth wheel trailer hitch which is often normally permanently mounted on a vehicle. The trailer hitch structure is simple in construction, thus, economical and easy to manufacture. The hitch structure is simple to use because it has a minimum number of moving parts. Because the hitch is easily removable from its mount this feature enables a truck which has the hitch structure mounted on the floor of the bed to be used for carrying cargo when the hitch is not needed for towing. Also, because the hitch is easily removable it can be rapidly removed and stored to prevent theft or damage from vandalism or other causes.

While the invention has been described in conjunction with preferred specific embodiments thereof, it will be understood that this description is intended to illustrate and not to limit the scope of the invention, which is defined by the following claims.

I claim:

1. A fifth wheel type trailer hitch, comprising:
   a. a mount means having a mounting plate rigidly mountable on a supporting structure and a pair of spaced upright end portions, said mounting plate having means to removably mount said upright end portions, and said upright end portions each having in the upper portion thereof a pair of oppositely extending lugs on a lower portion thereof to pivotally receive and mount a shaft, said means to removably mount said upright end portions has a socket and guide means to receive and hold said lugs in a mounted relation,
   b. a cross member having a shaft mounting means in opposite portions thereof and having a shaft mounted in said shaft mounting means and extending from said cross member, said shaft being mounted in said means to pivotally receive and mount a shaft,
   c. coupling means mounted on the upper side of said cross member and constructed and adapted to receive and mount in towing relation a cooperative coupling means on a trailer or the like, and
   d. said coupling means has an entrance slot in said cross member, a jaw member movably mounted with said cross member, a locking bolt slidably mounted to secure said jaw member in an operating position and a second locking bolt slidably mounted to in use secure said first named locking bolt when said first named locking bolt is securing said jaw member.

2. The hitch of claim 1, wherein:
   a. said socket and guide means has a pair of socket members rigidly secured to the upper side of said mounting plate on one edge portion thereof, said socket members opening toward the center portion of said mounting plate, and
   b. said socket and guide means has a pair of guide members rigidly secured to said mounting plate on an edge portion thereof opposite to said first named edge portion and opposite to said socket members, said guide members opening toward said socket members and opening upward.

3. The hitch of claim 2, wherein:
   a. said means to removably mount said end portions has an aperture through one of said lugs on each of said upright end portions, an aperture through said mounting plate, and a pair of bolts mountable through said apertures to rigidly secure said upright end members to said mounting plate, and
   b. said guide members are generally U-shaped members.

4. The hitch of claim 1, wherein:
   a. said jaw member has an open slot on one side thereof and said jaw member is pivotally mounted on the underside of said cross member, said jaw member being pivotal between a first position with said slot being generally transverse to said entrance slot and a second position with said slot opening into said entrance slot in the same general direction as said entrance slot, b. said first named locking bolt being slidable to an extended position having one end thereof contacting said jaw member to prevent rotation thereof, and c. said second locking bolt being engagable with an end portion of said first named locking bolt opposite said first named end thereof to secure said first named locking bolt in said extended position.

5. The hitch of claim 1, wherein, said hitch is mountable on the bed of a truck on the floor thereof.

6. The hitch of claim 1, wherein, said hitch is mountable on a horizontally disposed portion of a vehicle bumper.

* * * * *